United States Patent [19]

Remer

[11] Patent Number: 4,840,457
[45] Date of Patent: Jun. 20, 1989

[54] ANGLED STRUT DIAPHRAGM SPRING

[75] Inventor: James N. Remer, Cherry Hill, N.J.

[73] Assignee: General Electric Company, Camden, N.J.

[21] Appl. No.: 134,121

[22] Filed: Dec. 17, 1987

[51] Int. Cl.⁴ .................................................. G02B 7/02
[52] U.S. Cl. ...................................... 350/255; 369/45
[58] Field of Search .................. 350/255, 247; 369/44, 369/45, 46

[56] References Cited

U.S. PATENT DOCUMENTS

| | | | |
|---|---|---|---|
| 4,302,830 | 11/1981 | Hamaoka et al. ...................... | 369/45 |
| 4,472,024 | 9/1984 | Konomura et al. .................. | 350/247 |
| 4,571,715 | 2/1986 | Kato et al. ............................ | 369/45 |
| 4,616,355 | 10/1986 | Kasahara ................................. | 369/45 |

Primary Examiner—Bruce Y. Arnold
Assistant Examiner—Loha Ben
Attorney, Agent, or Firm—Raymond E. Smiley

[57] ABSTRACT

The inability of the lens of an optical disc recorder to focus rapidly may be the salient factor limiting the data transducing rate. In order to provide smooth motion of the focus head and to maximize its speed, a focus lens assembly for an optical disc recorder is resiliently supported by one or more diaphragm springs, and is driven by a magnetic-coil arrangement to focus light onto the optical disc. Each diaphragm spring includes inner and outer support regions connected by a plurality of resilient support arms. Each support arm has straight, parallel sides and extends nonradially.

10 Claims, 4 Drawing Sheets

ANGLED STRUT DIAPHRAGM SPRING

BACKGROUND OF THE INVENTION

This invention relates to support diaphragms for elements which are translated axially, especially for servo-focused optical elements in an optical disc recorder.

Optical disc recorder-playback arrangements (recorders) ordinarily use one or more laser diodes to produce beams of light which are focused onto the surface of a rotating disc for causing changes in the surface of the disc for recording, or for sensing the state of the disc for playback. In order to achieve a high stored data density on the disc, the individual recorded data bits must be represented by small physical features on the disc surface. At the current state of the art, each data bit as recorded on the storage disc has dimensions on the order of a wavelength of light.

In order to record or sense such small data imprints, the beam of light produced by the laser of the recorder must be focussed onto the disc surface. As the storage disc rotates, unavoidable manufacturing tolerances, together with the effects of imperfect aging of the disc materials, result in variations in the distance between the disc surface and the lens. These variations of distance may result in defocussing of the light beam at the disc surface, which in turn results in spreading of the data over a larger portion of the disc surface during recording, or in sensing of more than one data element or bit upon playback. In either case, the result may be inability to properly record and recover the data.

In order to prevent loss of data, optical disc recorders ordinarily provide a focus servo loop for sensing the amount of focusing at the disc surface, and for moving the lens assembly in a direction normal or orthogonal to the disc surface in order to attempt to maintain focus. For this purpose, the lens assembly is resiliently mounted to a frame (which may itself be mounted for radial translation relative to the disc), and arranged with transducers which apply forces to the lens assembly to urge it in the desired direction under the influence of the servo loop. As is known to those skilled in the servo art, such servo loops have characteristic gain-bandwidth curves which are established by the characteristics of the elements of the servo loop, which includes the effects of the characteristics of the lens assembly and its resilient mounting. Very often, the major limitations on the gain or bandwidth of the servo loop are imposed by the mass and resonant characteristics of the movable portions of the lens assembly and of the resilient mounting. Since the rate of variation of distance is determined by the angular velocity of the disc, the speed of focus may be the salient limitation on disc speed, which in turn is a major limitation on data rate, both in recording and in reading data.

Optical discs often make 30 or 60 rotations per second (RPS). The variations in spacing between the disc surface and the lens which occur at the corresponding once-around rate of 30 Hz or 60 Hz are caused by disc warpage, and these tend to be the largest-amplitude spacing variations. Ordinarily, discs have less than 0.010 inch (0.25 mm) of warp. The surface of the disc is irregular at a microscopic scale, and the rate at which the spacing variations which correspond to the microscopic irregularities pass the read head may be represented as an amplitude-frequency spectrum which resembles a noise spectrum, in which the larger variations tend to occur at lower frequencies, with the higher-frequency variations having a lower amplitude. Thus, the largest amplitude variations of a typical disc may be accommodated by a focus head movement of about 10/1000 inch.

In the past, focus servos for optical disc recorders have had a frequency bandwidth of up to 4 kHz. However, the bandwidth of the significant high-frequency variations in the disc-to-lens assembly spacing extends to higher frequencies. It is known that the mass of the lens assembly must be minimized and its resonant frequency maximized, and that the resilient mounting must provide smooth axial translation, a range of compliance at least equal to the largest expected spacing variations, and a high resonant frequency.

In the prior art, a resilient mounting has been provided by one or more spiral springs wound about a substantially cylindrical lens assembly, with one end of each spring attached to the lens assembly and the other end attached to a frame. As described below, such a structure tends to have relatively low frequency non-axial modes of vibration and particularly vibration of the spring itself which limit the focus servo frequency bandwidth.

A resilient mounting for a lens assembly is desired which provides a large range of smooth compliance, and for which undesirable modes of vibration are at a high frequency.

SUMMARY OF THE INVENTION

A flat, thin diaphragm spring for allowing axial motion along an axis includes a circular inner support portion adapted to be mechanically connected to an element centered on the axis and movable with respect to a reference frame, and also includes a circular outer support portion adapted to be affixed to the reference frame. A number of flat, thin connecting strut portions or springlets extend from the inner to the outer support portions. The sides of each strut are approximately parallel, and the struts are angled relative to radials from the axis in such a fashion that any radial passing through a connecting strut perforce passes through at least one side of the strut.

DESCRIPTION OF THE INVENTION

Figure 1:
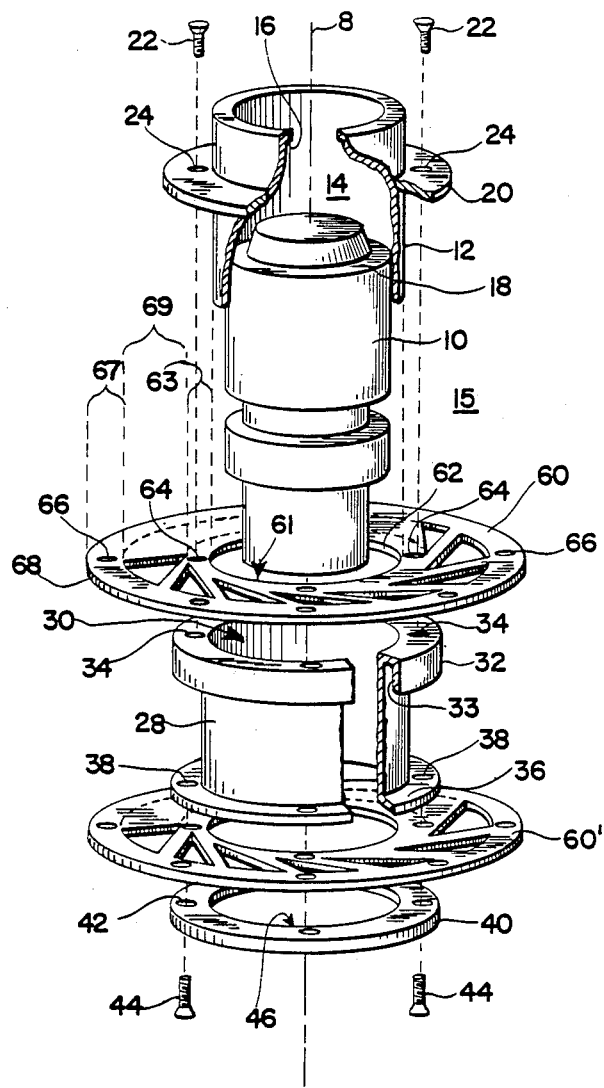
FIG. 1 is an exploded perspective or isometric view of a simplified focus lens assembly, together with a resilient mounting according to the invention, which is adapted to be connected to a support frame.

FIG. 1 is a perspective or isometric view in exploded form of a simplified lens assembly and resilient mounting according to the invention. Portions of the elements illustrated in FIG. 1 are cut away to show interior details.

In FIG. 1, a cylindrical lens assembly 10 is centered about an axis 8. A first sleeve 12 has an interior bore 14 dimensioned to closely fit over a portion of lens assembly 10. Bore 14 of sleeve 12 includes a lip 16 which abuts annular surface 18 of lens assembly 10 when sleeve 12 is assembled onto the lens assembly. Sleeve 12 also includes an annular mounting flange 20 in which a number of clearance holes illustrated as 24 are provided for screws 22. As described below, mounting flange 20 constitutes a portion of an inner support ring to which a resilient mounting is connected. A second sleeve 28 has an inner bore 30 dimensioned for a snug fit over the exterior of the body of first sleeve 12, and for a snug fit over the exterior of lens assembly 10 in those portions to which sleeve 12 does not extend. Second sleeve 28 includes a flange 32 having the same exterior diameter as flange 20 of first sleeve 12. Flange 32 includes threaded apertures 34 having the same pattern as the clearance apertures 24 in flange 20, so that, when first and second sleeves 12 and 28 are assembled, screws 22 which pass through clearance holes 24 may be threaded into apertures 34 in flange 32. Flange 32 also includes an overhanging lip 33, the purpose of which is described in conjunction with FIG. 2.

Second sleeve 28 also includes a further flange 36 with a pattern of threaded apertures 38. A substantially planar pressure ring 40 has the same diameter as flange 36, and includes a pattern of clearance holes 42 for screws 44, so that, when assembled, screws 44 pass through clearance holes 42 and may be tightened into threaded holes 38 in flange 36. Pressure ring 40 may include a bore 46 through which a light beam may reach lens assembly 10, or through which lens assembly 10 may protrude if its dimensions so require. Lens assembly 10, sleeves 12 and 28, and pressure ring 40 together constitute the principal movable portion, designated generally as 15, of the arrangement of FIG. 1. Resilient mounting of the movable portion 15 including lens assembly 10, first and second sleeves 12 and 28, and pressure ring 40 is provided by upper and lower diaphragm springs 60 and 60', respectively. Diaphragm springs 60 are identical in principle and may be identical in practice, so only diaphragm spring 60 is described in detail.

As illustrated in FIG. 1, upper diaphragm spring 60 is in the form of a thin sheet of relatively elastic metal such as beryllium copper. Diaphragm spring 60 is in the overall shape of an annulus, having an outer diameter substantially larger than the flanges 20, 32, or 36, and also having a circular inner aperture 61 with a diameter dimensioned to clear the body of sleeve 12, but not clear flanges 20 or 32. Adjacent to inner periphery 62 of diaphragm spring 60 is an inner support portion 63 which includes a set of clearance holes 64 having the same layout pattern as holes 24 in flange 20 and holes 34 in flange 32. When assembled, the inner support portion 63 of diaphragm spring 60 near inner periphery 62 and including clearance holes 64 is sandwiched between flanges 20 and 32. When screws 22 are tightened, inner support region 63 of diaphragm spring 60 becomes firmly clamped to the assembled structure of lens assembly 10, and to sleeves 12 and 28.

Figure 6:
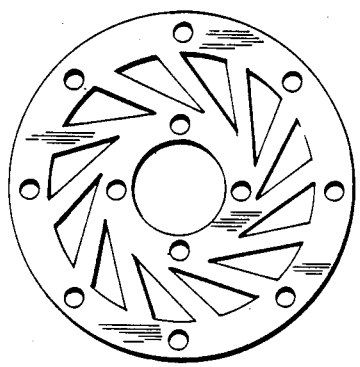
FIG. 6 is a plan view of a diaphragm spring according to the invention.

A pattern of clearance holes 66 is formed in a peripheral or outer support portion 67 of diaphragm springs 60 adjacent outer periphery 68. As described hereinafter, mounting holes 66 are provided to facilitate mounting of an outer support portion of diaphragm spring 60 to a mounting frame (not illustrated in FIG. 1). An annular region 69 between inner support region 63 and outer support region 67 constitutes the principal resilient portion of diaphragm springs 60. With outer support region 67 and outer periphery 68 of diaphragm spring 60 at a relatively fixed position, and with movable portion 15 including lens assembly 10 and sleeves 12 and 28 affixed to inner support region 63, a force applied to lens assembly 10, or to its associated sleeves directed parallel to axis 8 will result in axial motion of lens assembly 10. Naturally, the amount of motion permitted by diaphragm spring 60 depends upon the characteristics of the resilient portion 69 of the diaphragm spring. As illustrated in FIG. 1, resilient portion 69 includes a plurality of springlets, each in the form of a nonradial support arm or strut. The resilient portion is described in more detail below in conjunction with FIG. 5. FIG. 6 is a plan view of a diaphragm spring according to the invention.

Figure 2:
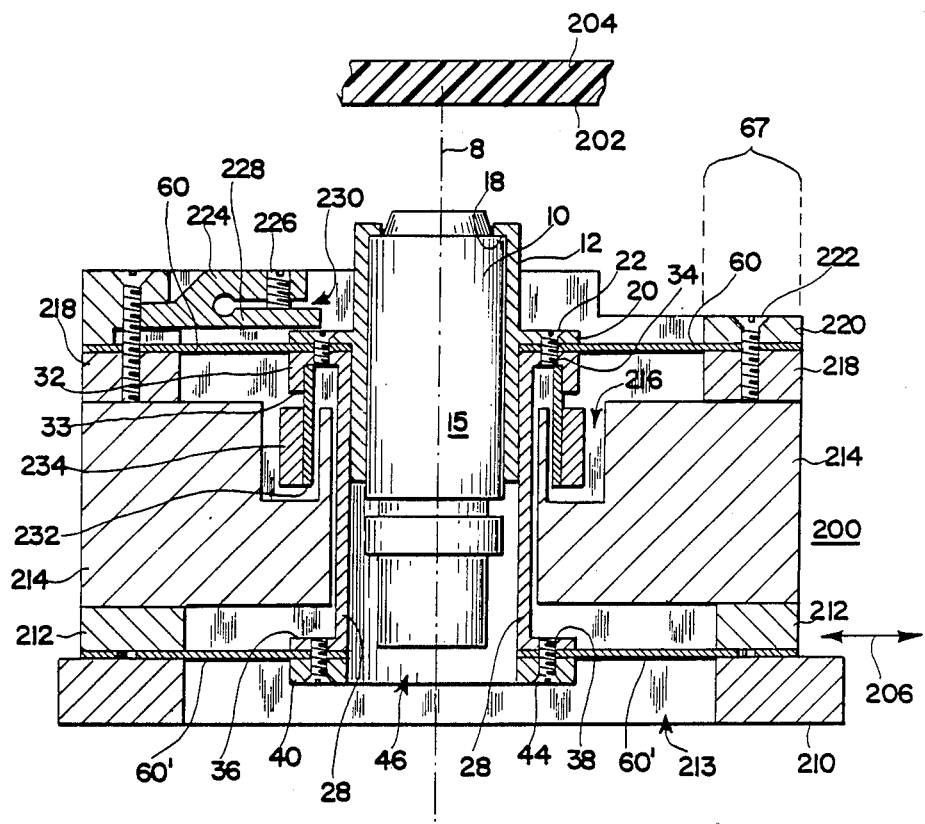
FIG. 2 illustrates the lens assembly and a cross-section of the resilient mounting of FIG. 1 and an associated portion of a support frame, illustrating its relationship to an optical disc.

FIG. 2 illustrates, in cross-sectional view, the structure of FIG. 1 together with a mounting frame. In FIG. 2, elements corresponding to those of FIG. 1 are designated by the same reference numeral. In FIG. 2, a frame designated generally as 200 provides fixed support for diaphragm springs 60 and 60' which, in turn, support movable portion 15 including lens assembly 10, first and second sleeves 12 and 28, and pressure plate 40. As illustrated in FIG. 2, axis 8 is normal to the flat surface 202 of an optical disc medium, a portion of which is illustrated as 204. Frame 200 may be mounted on a slide (not illustrated) adapted for motion in a direction indicated by double-ended arrow 206, which is a direction parallel to surface 202 of disc 204.

Frame 200 includes a base element 210 defining a central bore 213, selected to be large enough to provide clearance for the motion of lens assembly 10 and diaphragm spring 60', but small enough so that the outer edge or outer support region (corresponding to 67) of diaphragm spring 60' may be supported thereby. An annular element 212 clamps the outer support region of diaphragm 60' to base element 210 by means of screws (one of which is illustrated as 44). An annular magnetic element 214 affixed to element 212 includes permanent magnet portions and permeable portions (not separately illustrated), and includes an annular notch 216 across which a magnetic field is generated. The magnetic field formed in notch 216 aids in axial drive of movable portion 15 as described below. Frame 200 further includes an annular support 218 affixed to magnetic element 214, whereby it is in a fixed portion relative to clamp element 212 and to base plate 210. Annular element 218 performs a function similar to that of element 212, in that it provides support for the outer support region 67 of diaphragm spring 60. An upper annular element 220 clamps the outer periphery of diaphragm spring 60 against annular element 218 by way of a set of screws, one of which is illustrated as 222.

At the upper left of the structure in FIG. 2, annular element 220 includes a relatively rigid arm 224 protruding radially toward axis 8. Arm 224 includes a threaded aperture into which a set screw 226 is screwed. Set screw 226 bears against a relatively flexible lower arm 228 separated from arm 224 by a radial slot 230. Adjustment of the position of the screw 226 allows arm 228 to be moved closer to or farther from the upper edge of flange 20 of first sleeve 12. Thus, axial motion of movable portion 15 toward disc 204 may be limited at a position selected by set screw 226. In order to avoid cocking of the lens in the event that it hits the stop, three or more such stops should be spaced about flange 20. A similar set of stops (not illustrated) may be used in conjunction with base plate 210 to limit the travel of movable portion 15 away from disc 204.

A thin, lightweight, nonmagnetic ring 232 is force-fitted or bonded to the inner surface of lip 33 of flange 32, and moves together with movable portion 15. A magnetic winding or electromagnet illustrated as 234 is wound on the surface of nonmagnetic ring 232 for interacting with the magnetic field formed in annular gap 216 by magnetic element 214 in order to produce the desired axial force to drive movable element 15 in the desired manner. Electromagnet 234 is connected to a source of servo drive signals (not illustrated) by fine wire (not illustrated) similar to that used for loudspeaker voice coils, as is known in the art.

In operation, electromagnet 234 receives drive signals to produce a magnetic field which interacts with the magnetic field produced in annular slot 216 by permanent magnet element 214 to create axial drive forces to cause movable element 15 including lens assembly 10 to move along axis 8, toward and away from surface 202 of optical disc 204, as required to track variations in the distance therebetween. The mass of movable element 15 should be minimized in order to reduce the magnitude of the force necessary to provide the desired acceleration, and thereby to reduce the power dissipation in electromagnets 234. Reduction of the mass of movable element 15 is also desirable in order to increase the resonant frequency of the mechanical structure including movable element 15 and the restorative forces imparted by diaphragm spring 60.

Figure 3A:
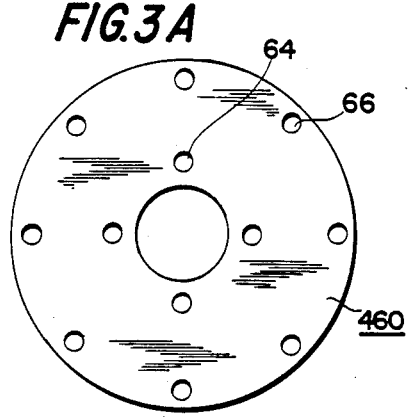
FIG. 3a illustrates a solid diaphragm spring.
Figure 3B:
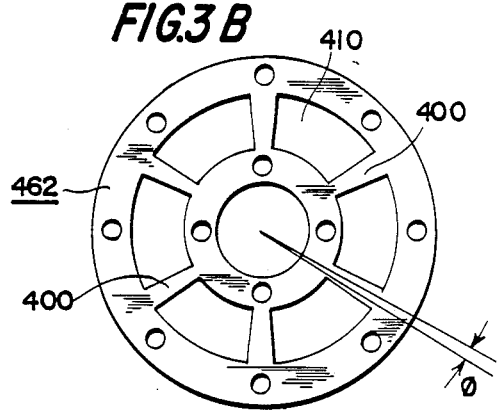
FIG. 3b illustrates a spoked diaphragm spring.

FIG. 3a illustrates a solid diaphragm spring 460 which might be used instead of a spring 60 in the arrangement of FIG. 2. Such solid springs have been found to be undesirable, because they do not provide smooth motion. Solid diaphragm springs such as spring 460 of FIG. 3a tend to have two stable states, and tend to snap between the two stable states in a manner similar to the snapping of the lid of an oil can. Hence, such a tendency to bistable operation is known as "oil-canning" and arises from the necessity that the metal which leads straight from the outside to the inside either buckle or stretch. The arrangement of the resilient portion of spring 462 FIG. 3b has support arms or springlets in the form of radial spokes 400 defined between cutouts 410. While it may not be intuitively obvious, the spoked arrangement of FIG. 3b also suffers from oil-canning. This is reasonable, considering that the shape taken in any small angular sector φ taken through a spoke, as illustrated in FIG. 3b, is identical to a corresponding sector of the arrangement of FIG. 3a, and therefore acts in the same manner.

Figure 4A:
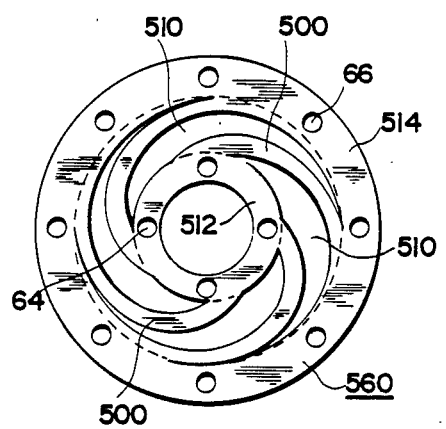
FIG. 4a illustrates a prior art sinuous or spiralled diaphragm spring.

FIG. 4a illustrates a prior art diaphragm spring 560 which might be used instead of spring 60 in the arrangement of FIG. 2. As illustrated in FIG. 4a, a series of spiral support arms or springlets 500 are defined by cutouts 510. The spiral arms extend from the inner circular support portion 512 of the diaphragm spring to the outer support portion 514. Such springs provide smooth motion with substantial compliance. However, they are disadvantageous by comparison with the arrangement of the invention, for reasons described below.

Figure 4B:
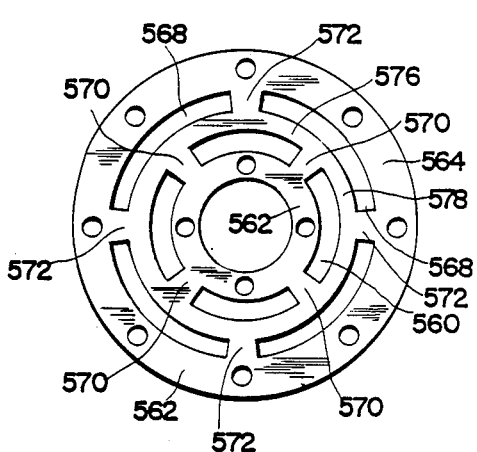
FIG. 4b illustrates a labyrinth or ring style diaphragm spring.

The arrangement of the resilient portion of spring 562 of FIG. 4b may be termed a "ring" or alternatively a "labyrinth". The labyrinth arrangement of FIG. 4b is, in fact, very similar in principle to the spiral arrangement of FIG. 4a and has the same disadvantages. The diaphragm spring of FIG. 4b includes an inner support portion 562 and an outer support portion 564. A set of inner sectoral cutouts, one of which is designated 560, defines four inner short or stub support arms, designated 570. A series of sectoral cutouts 568 defines further stub support portions, designated 572. The combination of cutouts 560 and 568 creates a further set of contiguous ring segments or arms 576, 578 which connect outer stub arm portions 572 with inner stub arm portions 570. An intuitive approach suggested that more ring segments could be added to the arrangement of FIG. 4b to increase the range of compliance or working displacement without adversely affecting the frequency response (as measured by the ratio fs/fn, described below), because only the number and not the length of the spring elements was being increased. This was not the case. This may be understood if only one interconnecting arm, such as 576, is considered together with stub arm portions 570, 572. They can be recognized as a piecewise-linear approximation to a spiral support arm such as that of FIG. 4a. The labyrinth structure of diaphragm spring 562 amounts to joined piecewise-linear spiral support arms, which are longer than the corresponding spiral arms.

The disadvantage of the arrangements of FIGS. 4a and 4b lies in the relatively low resonant frequency of the arms. Those skilled in the art know that the resonant frequency may be increased by shortening the arms or by increasing the thickness (the direction perpendicular to the plane of the FIGURE) of the arms 500 of FIG. 4a. However, increasing the thickness of the material also reduces the compliance, and tends to limit the amount of excursion available at a given force.

Figure 5:
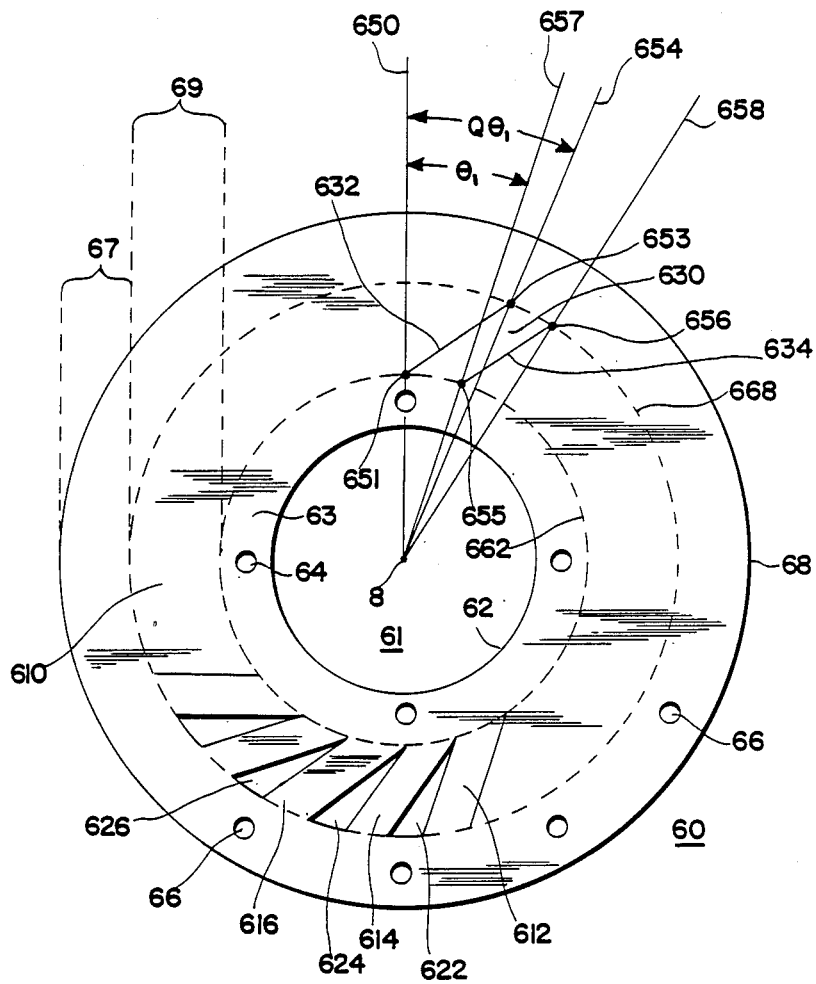
FIG. 5 is a plan view illustrating salient features of a diaphragm spring according to the invention.

FIG. 5 is a plan view of a diaphragm spring according to the invention, illustrating some of the cutouts which define support arms or springlets. Those elements of FIG. 5 corresponding to elements of FIGS. 1 and 2 are designated by the same reference numerals. In FIG. 5, annular inner support portion 63 of diaphragm spring 60 lies between periphery 62 of central aperture 61 and a dashed line 662. Dashed line 662 represents the location of the edge of flanges 20 and 32 when the structure of FIG. 1 is assembled. Consequently, annular region 63 represents the portion of diaphragm spring 60 which is clamped between flanges 20 and 32 of FIG. 1 when the structure is assembled. Consequently, region 63 of FIG. 5 cannot flex, and is a support portion of the diaphragm spring which is adapted for connection to movable portion 15 of FIG. 1. Similarly, annular region 67 lying between outer periphery 68 and a dashed circle 668 represents that portion of diaphragm spring 60 which is clamped between frame elements 218 and 220 of FIG. 2 when the structure of FIG. 2 is assembled. Portion 67 of diaphragm spring 60, being clamped between frame members, is incapable of being flexed and represents an outer support portion of the diaphragm spring. The resilient portion of diaphragm spring 60 which is available for flexure lies in annular region 69 between dashed lines 662 and 668.

According to the invention, the flexing or resilient portion 69 of diaphragm spring 60 consists of a plurality of nonradial support arms or struts connecting inner support portion 63 to outer support portion 67. Each of the support arms is an elongated element with substantially straight, substantially parallel sides which are angled with respect to radial lines extending from the center at axis 8. Typical support arms are illustrated as 612, 614, and 616 . . . , which are defined by triangle-like cut-away portions 622, 624, 626 . . . . Each cut-away portion 622, 624, 626 . . . preferably has two substantially straight sides joining at a vertex adjacent dashed line 662, and includes a curved third side which follows dashed line 668. The thickness of each support arm 612, 614, 616 . . . in a direction perpendicular to the plane of FIG. 5 is the same as the thickness of the remainder of the material of the diaphragm spring. As illustrated, the inner and outer support portions of the spring, and the central resilient portion, are all formed from a monolithic sheet of material.

In accordance with the invention, the angle made by the sides of each support arm with radials emanating from central axis 8 is such that, in effect, no radial can be found along which a continuous path of the material of the support arm extends from inner support portion 63 to outer support portion 67. This may be explained with reference to support arm 630. As illustrated in FIG. 5, support arm 630 includes a first substantially straight side 632 and a second substantially straight side 634 essentially parallel to side 632. A reference radial illustrated as 650 passes through a point 651 which represents the junction of side 632 of support arm 630 with inner annular support region 63 at dashed line 662. The opposite end of side 632 of support arm 630 intersects outer annular support region 67 at a point 653 lying on a radial 654. Side 634 of support arm 630 intersects inner annular support region 63 at a point 655 lying on dashed line 662, and intersects outer annular support region 67 at a point 656 lying on dashed line 668. Point 655 lies on a radial illustrated as 657. Radial 657 is separated from radial 650 by an angle $+\theta_1$, where positive values of $\theta$ are clockwise in FIG. 6. Radial 657 is closer to radial 650 than is radial 654, which is separated from radial 650 by an angle $+Q\theta_1$, where $Q>1$. Consequently, all radials lying between radials 650 and 657 encounter a gap in the material of diaphragm spring 60, the gap lying in the region between side 632 and dashed line 668. Radials lying between radials 654 and 657 cross two gaps within resilient region 610, a first lying in the region between dashed line 662 and side 634 of support arm 630, and a second lying between side 632 of support arm 630 and dashed line 668. Those radials lying between radials 654 and 658 encounter a single gap, namely that gap lying in the region between dashed line 662 and side 634 of support arm 630. It should be noted that, if the support arms lying in spring region 610 are closely spaced as illustrated by support arms 612, 614 . . . , that the gaps in the material of diaphragm spring 60 will still exist adjacent the sides, such as sides 632 and 634 of support arm 630, but may not extend all the way to the edges of the inner and outer support regions 63 and 67. Nevertheless, the existence of a gap in spring region 610 for all radials prevents oil-canning and therefore promotes relatively smooth motion.

Oil-canning is prevented by angling the support arms and by selecting the points of intersection of the sides of the support arms to prevent a radial line of material between the inner and outer support regions. The angle made by the support arm and its sides with a radial is selected so that the length of the support arm is sufficient to provide the desired range of compliance. Based upon the results of finite-element analysis and contrary to intuition, it has been determined that the sides of a support arm, such as sides 632 and 634 of support arm 630 of FIG. 5, should be substantially parallel (the arms should not be tapered in width) in order to have the highest possible self-resonant frequency of the support arm.

A design procedure for laying out the support arms on a diaphragm spring considers the thickness, material and geometry of the spring, and may consider the moving mass. For a diaphragm spring with support arms such as those of FIG. 4b, the natural frequency of the spring/mass system is proportional to $$\text{fn} \propto (t^{1.5}, E^{0.5}, w^{0.5}, L^{-1.5}, \text{and } m^{-0.5}), \quad (1)$$

and the fundamental natural frequency $f_s$ of each spring is proportional to $$\text{fs} \propto (t, E^{0.659}, L^{-2}, \rho^{-0.5}) \quad (2)$$

where
t = thickness of the spring
E = Young's modulus of the spring material
w = width of each spring segment
L = length of each spring segment
m = moving mass
$\rho$ = density of the spring material.

For use with a focus head, the ratio fs/fn should be a maximum, which suggests decreasing the values of t, w, L and $\rho$, and increasing the values of E and m. Also, the ratio of fs/fn may be improved by changes in the geometry of the resilient portion, and more specifically by appropriate selection of the shape and disposition of each support arm or springlet.

The frequencies of undesirable motional modes of the moving lens cell body such as tilting and translation in the plane of the diaphragm spring may be reduced (made worse) by minimizing thickness t and width w, and by increasing the moving mass m. Thus, these undesirable body modes present a lower limit on the selection of t and w and a maximum limit on m.

Noting that fs/fn is proportional to $E/\rho$, achieving high values of fs/fn may be aided by use of materials such as
beryllium—$E/\rho=560$
aluminum—118
carbon steel—106
stainless steel—100
magnesium alloy—98
beryllium copper—57.

The beryllium copper has the best fatigue resistance, and is the material of choice. Beryllium would be advantageous but for its poor notch resistance.

A firm mathematical foundation for determining the working range of compliance or displacement has not been found, but the range is dependent upon thickness t and is approximately proportional to $t^{-2.75}$, at least for spiral springs similar to those of FIG. 4a.

A possible design procedure begins with preestablished inside (ID) and outside (OD) diameters (from the diameter of the lens, and taking into account the need for inner and outer support regions). An estimate is then made of the width w of one support arm or strut. With this estimated width, the number n of struts can be determined by assuming that they are contiguous (touching or nearly touching) at the known inner diameter, and by use of the expression $$\pi + \pi(\text{ID})/w \quad (3)$$

Since n as calculated may be a fractional number, and there can be no fractional support element, the number n is rounded down to the next lower integer to become $n_i$. The angular distance $\theta_1$ along the working ID is calculated from $$\theta_1 + 360°/n_i \tag{4}$$

Referring to FIG. 5 to form the layout, select a reference radial line (650). Its intersection with ID (dashed line 662) is the beginning of one side of the support strut. Move in the positive angular direction from radial line 650 by an angle $Q\theta_1$, where Q is a coefficient having a value greater than unity, which may be 1.2. Draw a radial (654) at angle $Q\theta_1$. The intersection of radial 654 with the OD (line 668) establishes the end of the first side of the support strut, and also establishes the length of the support strut. The value of Q must be selected to provide a length of the support strut which provides the desired compliance range and resonant frequency fs. The other side of the support strut begins on ID at an angle $\theta_1$ from reference radial 650, namely at the intersection 655 of radial 657 with dashed line 662. Point 656 at which the second side ends is $Q\theta_1$ from radial 657, on dashed line 668. The remaining support struts can be generated by repeating the layout operations by assigning radial line 657 as the new reference radial, using the same values of Q and $\theta_1$.

In operation, there is a small rotation of the lens as a function of axial displacement. So long as the lens is not astigmatic, this has no undesirable effect.

A particular embodiment of diaphragm spring made from 0.006 inch (0.152 mm) beryllium copper, with 12 support struts 0.100 inch (2.54 mm) wide, angularly spaced by $\theta_1 = 30°$, and with sides inclined as established by $Q\theta_1 = 49°$, extending between an ID of 1.000 inch (25.4 mm) and an OD of 1.750 inch (44.5 mm) had spring resonances fs of 5500 Hz and a fundamental resonance of 100 Hz when used with a lens assembly with a total moving mass of 1.13 oz (32 gm), and gave a usable range of compliance of ±0.015 inch (±0.38 mm). Such a spring may be made by corrosive etching methods.

The prior art labyrinth spring which was replaced by this angled strut spring had a fundamental resonance of 43 Hz, spring resonances at 990 Hz, and approximately the same range of compliance.

Other embodiments of the invention will be apparent to those skilled in the art. For example, the compliance range of 0.015 inch described above may be made greater if required to handle a greater amount of disc-to-focus-head variations, or the use of improved recording discs may make it possible to provide a lesser range of focus head compliance. The inner and outer support portions of each diaphragm spring may be connected to the adjacent movable portion or frame by an adhesive or by bonding rather than by screws as described, which may have the advantage of reducing the mass of the movable portion. While the illustrated embodiments of the diaphragm spring have screw clearance holes in the inner and outer support regions, it may not be desirable to have screws as part of the moving element 15, so the inner support portion of the diaphragm spring may be made relatively narrow, without screw holes. For diaphragm springs without screw holes, the inner support region may be bonded to the moving element. The light source may be included within the focus head assembly if desired, the lens thereby providing a focal point which is fixed in space relative to the movable source/lens assembly, with the focal point being moved under the control of the voice coil to the surface of the disc medium.

What is claimed is:

1. An arrangement supporting a lens relative to a frame for providing motion normal to a flat surface of a disc storage medium, comprising:
    a lens arrangement adapted for motion in a direction along a lens axis and normal to said flat surface of said disc;
    at least one thin, flat support means, said support means including a first circular support region fixed to the periphery of said lens arrangement, said first circular support region having a diameter, said support means further including a second circular support region mechanically affixed to said frame, said second circular support region having a diameter greater than said diameter of said first circular support region and being coaxial therewith, said support means further comprising a plurality of elongated arms extending between and interconnecting said first and second circular support regions of said support means, each of said elongated arms having substantially straight, parallel first and second elongated sides, one end of said first elongated side of each arm joining said first circular support region at a respective reference radial from said axis, and a second end of said first elongated side joining said second circular support region at a respective second radial angularly displaced from said reference radial in one angular direction, one end of said second elongated side of each arm joining said first circular support region at a respective third radial displaced from said reference radial in an angular direction opposite to said one angular direction, the other end of said second elongated side extending to join said second circular support region at a point within the arc subtended by said reference and second radials.

2. An arrangement according to claim 1 wherein said lens arrangement comprises a flange mechanically coupled to said first circular support region of said support means.

3. An arrangement according to claim 2 wherein said second circular support region of said support means is adapted to be clamped between mating faces of flanges of said frame.

4. An arrangement according to claim 1 wherein said plurality of elongated arms are defined by triangle-like cutout portions.

5. An arrangement according to claim 1 wherein said support means is formed from a sheet of beryllium copper.

6. An arrangement according to claim 5 wherein said sheet of beryllium copper is less than 0.005 inch thick 7. A support for a focus lens in a disc recorder for allowing said lens to move normal to a surface of a disc referenced to a support frame, said support comprising:
    a thin, flat, inner support portion in the form of an annulus centered on an axis, said inner support portion being adapted to be mechanically coupled to said lens:
    a thin, flat, circular outer support portion, said outer support portion being adapted to be coupled to said support frame, said outer support portion further being larger in diameter than said inner support portion and concentric therewith, said outer support portion being substantially coplanar with said inner support portion when said support is in an undeflected state; and a plurality of thin, flat arms joining said inner and outer support portions, each of said arms including first and second substantially straight parallel sides, said sides of said each of said arms extending between said inner and outer support portions along non-radial lines relative to said axis in such a fashion that any radial line originating at said axis which passes through one of said arms passes through at least one of said sides of said one arm.

8. A support according to claim 7 wherein each of said first and second sides of each of said arms includes first and second ends, and wherein said first end of said first side of one of said arms intersects said inner support portion at a reference radial and said second end of said first side of said one arm intersects said outer support portion at a second radial angularly displaced in a first direction from said reference radial, and said first end of said second side of said one arm intersects said outer support portion at a third radial displaced in said first direction from said second radial, and said second end of said second side of said one arm intersects said inner support portion at a fourth radial lying within the acute angle included between said reference and second radials.

9. A support for a movable piece for allowing said piece to move parallel to an axis, said support comprising:
 a thin, flat inner support portion in the form of an annulus centered on said axis, said inner support portion being adapted to be mechanically coupled to said piece:
 a thin, flat, circular outer support portion, said outer support portion being adapted to be coupled to said support frame, said outer support portion further being larger in diameter than said inner support portion and concentric therewith, said outer support portion being substantially coplanar with said inner support portion when said support is in an undeflected state; and
 a plurality of thin, flat arms joining said inner and outer support portions, each of said arms including first and second straight parallel sides, said sides of said each of said arms extending between said inner and outer support portions along substantially straight, non-radial lines relative to said axis in such a fashion that any radial line originating at said axis which passes through one of said arms passes through at least one of said sides of said one arm.

10. An arrangement pursuant to claim 9 further comprising electromagnetic drive means for driving said movable piece in the direction of said axis.

* * * * *

UNITED STATES PATENT AND TRADEMARK OFFICE
CERTIFICATE OF CORRECTION

PATENT NO. : 4,840,457

DATED : June 20, 1989

INVENTOR(S) : James Norman Remer

It is certified that error appears in the above-identified patent and that said Letters Patent is hereby corrected as shown below:

Column 8, line 63 (equation 3), "$\pi+\pi(ID)/w$" should be --$n=\pi(ID)/w$--.

Column 9, line 3 (equation 4), "$\theta_1+360°/n_i$" should be --$\theta_1=360°/n_i$--.

Signed and Sealed this

Twenty-second Day of May, 1990

Attest:

HARRY F. MANBECK, JR.

*Attesting Officer*      *Commissioner of Patents and Trademarks*